US006642695B1

(12) United States Patent
Huang

(10) Patent No.: US 6,642,695 B1
(45) Date of Patent: Nov. 4, 2003

(54) VOLTAGE MODE BOOST CONVERTER USING A PERIOD-FIXED AMPLITUDE-MODULATED PULSE CONTROL SIGNAL

(75) Inventor: Jia Jio Huang, Hsinchu (TW)

(73) Assignee: Faraday Technology Corp. (TW)

( * ) Notice: Subject to any disclaimer, the term of this patent is extended or adjusted under 35 U.S.C. 154(b) by 0 days.

(21) Appl. No.: 10/133,300

(22) Filed: Apr. 26, 2002

(51) Int. Cl.[7] .................................................. G05F 1/10
(52) U.S. Cl. ........................................................ 323/222
(58) Field of Search ................................ 323/222, 282, 323/283

(56) References Cited

U.S. PATENT DOCUMENTS 4,837,495 A * 6/1989 Zansky ........................ 323/222
5,146,398 A * 9/1992 Vila-Masot et al. ........... 363/89

* cited by examiner

Primary Examiner—Shawn Riley
(74) Attorney, Agent, or Firm—Martine & Penilla, LLP

(57) ABSTRACT

A voltage mode boost converter includes a control signal generating circuit, a step-up circuit, and a feedback circuit. The control signal generating circuit generates a step-up control pulse signal with a fixed period and a modulated amplitude. The step-up circuit adjusts an output voltage signal of the step-up circuit according to the step-up control pulse signal generated by the control signal generating circuit. The feedback circuit is electrically connected between the control signal generating circuit and the step-up circuit for generating a feedback voltage signal in accordance with the output voltage signal of the step-up circuit.

9 Claims, 5 Drawing Sheets

$$V_{out} = \frac{R_1 + R_2}{R_2} \times V_{ref2}$$

VOLTAGE MODE BOOST CONVERTER USING A PERIOD-FIXED AMPLITUDE-MODULATED PULSE CONTROL SIGNAL

BACKGROUND OF THE INVENTION

1. Field of the Invention

The invention relates to a voltage mode boost converter and, more particularly, to a voltage mode boost converter using a period-fixed amplitude-modulated pulse control signal.

2. Description of the Related Art

The voltage required by common semiconductor components or microelectronic devices is mostly between 3.0V and 5.5V, while the voltage source required by some devices may be larger; for example, the voltage for driving an LCD driver, or the voltage for a flash memory, which is mostly between 6V and 7V. Therefore, most industrial manufacturers provide a voltage mode boost converter to convert circuit voltage so that a lower voltage (3.0V–5.5V) can be stepped up (boosted) to a higher voltage (6V–7V) for use.

As shown in FIG. 1A, a conventional circuit configuration of a voltage mode boost converter 1 comprises a pulse-width modulation control circuit 11, a step-up (boost) circuit 12 and a feedback circuit 13.

As for the voltage mode boost converter 1, when it converts voltage, it must coordinate with a triangle wave generator (not shown), which is used to generate a triangle wave signal, and the triangle wave signal is input to the pulse-width modulation control circuit 11 to proceed with the pulse-width modulation control. As well known in the art, the pulse-width modulation control circuit 11 is operated in accordance with a clock.

The principle of the pulse-width modulation control is to use the feedback voltage signal $V_{FB}$, which is generated by the feedback circuit 13, and to use the triangle wave signal to adjust the waveform duty time. FIG. 1B is a diagram illustrating how to use the feedback voltage signal $V_{FB}$ to adjust the waveform duty time, wherein $V_{rp}$ and $V_{rn}$ each represents a peak value of the amplitude of the triangle wave signal, and $V_{FB1}$ and $V_{FB2}$ each represents the feedback voltage signal at different times. As shown in FIG. 1B, when the feedback voltage signal $V_{FB}$ is at $V_{FB1}$, its corresponding duty time is $T_1$, and when the feedback voltage signal $V_{FB}$ is at $V_{FB2}$, its corresponding duty time is $T_2$. In brief, the above-mentioned pulse-width modulation control circuit 11, in accordance with the feedback voltage signal $V_{FB}$ and the triangle wave signal, can generate a pulse signal with an adjustable duty time, and the pulse signal is a signal that appears at the point O shown in FIG. 1A, while the waveform of the signal that appears at the point O is shown in FIG. 1B.

In addition, as shown in FIG. 1A, the step-up circuit 12 of the voltage mode boost converter 1 comprises a MOS device as a switch, an inductor device L for providing an electric charge, a diode device D for rectifying, and a capacitor device C for storing an electric charge. Among these devices, the MOS device, the diode device, and the capacitor device are connected to one another in series, and the inductor device is connected between the MOS device and the diode device in parallel. The signal (i.e., the signal that appears at the point O) output by the pulse-width modulation control circuit 11 is for controlling the gate of the MOS device so that the inductor device L can charge to the capacitor device C.

Also, the feedback circuit 13 comprises a resistor $R_1$, a resistor $R_2$ and a feedback terminal 131. The resistor $R_1$ is connected to the resistor $R_2$ in series, and one end of the feedback terminal 131 is electrically connected between the resistor $R_1$ and the resistor $R_2$, while the other end of the feedback terminal 131 is electrically connected to the pulse-width modulation control circuit 11. The feedback circuit 13 is used to generate a feedback voltage signal $V_{FB}$ to the pulse-width modulation control circuit 11, and accordingly controls the output of the pulse-width modulation control circuit 11.

However, as for the voltage mode boost converter 1, it has a shortcoming that when stepping up (boosting) the voltage, it must rely on a triangle waveform generator to generate a triangle waveform signal; otherwise, the voltage mode boost converter 1 cannot operate smoothly, which means that the triangle waveform generator must keep on operating all the time. In other words, the voltage mode boost converter 1 cannot go into a standby mode.

As shown in FIG. 2A, another conventional voltage mode boost converter 2 comprises a pulse-frequency modulation control circuit 21, a step-up circuit 22 and a feedback circuit 23. As for the voltage mode boost converter 2, the circuit configuration and performance of its step-up circuit 22 and feedback circuit 23 are the same as those of the above-mentioned conventional voltage mode boost converter 1. The difference between the voltage mode boost converters 1 and 2 is that the latter uses a pulse-frequency modulation control circuit 21 to generate control signals. The pulse-frequency modulation control circuit 21 mainly utilizes the amplitude of the feedback voltage signal $V_{FB}$, which is output by the feedback circuit 23, to adjust the period of the control signal that appears at the point O. As well known in the art, the pulse-frequency modulation control circuit 21 is operated in accordance with a clock. As shown in FIG. 2B, the larger the feedback voltage signal $V_{FB}$ output by the feedback circuit 23 is, the larger the period of the control signal that appears at the point O will be.

However, as for the voltage mode boost converter 2, it has a shortcoming that the voltage output by the voltage mode boost converter 2 is affected by the change of amplitude of $V_{CC}$ voltage, thereby causing poor quality output voltage.

In view of the shortcomings of the conventional voltage converters, to provide a voltage mode boost converter with a standby mode and good quality output voltage becomes an important task.

SUMMARY OF THE INVENTION

The object of the invention is to provide a voltage mode boost converter, which has a standby mode and the feature of low standby current, and has good quality output voltage.

The feature of the invention is to provide a control signal generating circuit, which uses a feedback voltage signal to generate a step-up control pulse signal that is period-fixed and amplitude-modulated, so that the voltage mode boost converter of the invention can have a standby mode and a low standby current, and also ensure good quality output voltage.

Thus, to achieve the above-mentioned objective, a voltage mode boost converter in accordance with the invention comprises a control signal generating circuit, which is used to generate a step-up control pulse signal that is period-fixed and amplitude-modulated, a step-up circuit, which adjusts the output voltage signal of the step-up circuit according to the step-up control pulse signal generated by the control signal generating circuit, and a feedback circuit, which generates a feedback voltage signal according to the output voltage signal of the step-up circuit. The feedback voltage signal is input into the control signal generating circuit, and the control signal generating circuit generates the step-up control pulse signal according to the feedback voltage signal.

DESCRIPTION OF THE PREFERRED EMBODIMENTS

Figure 1A:
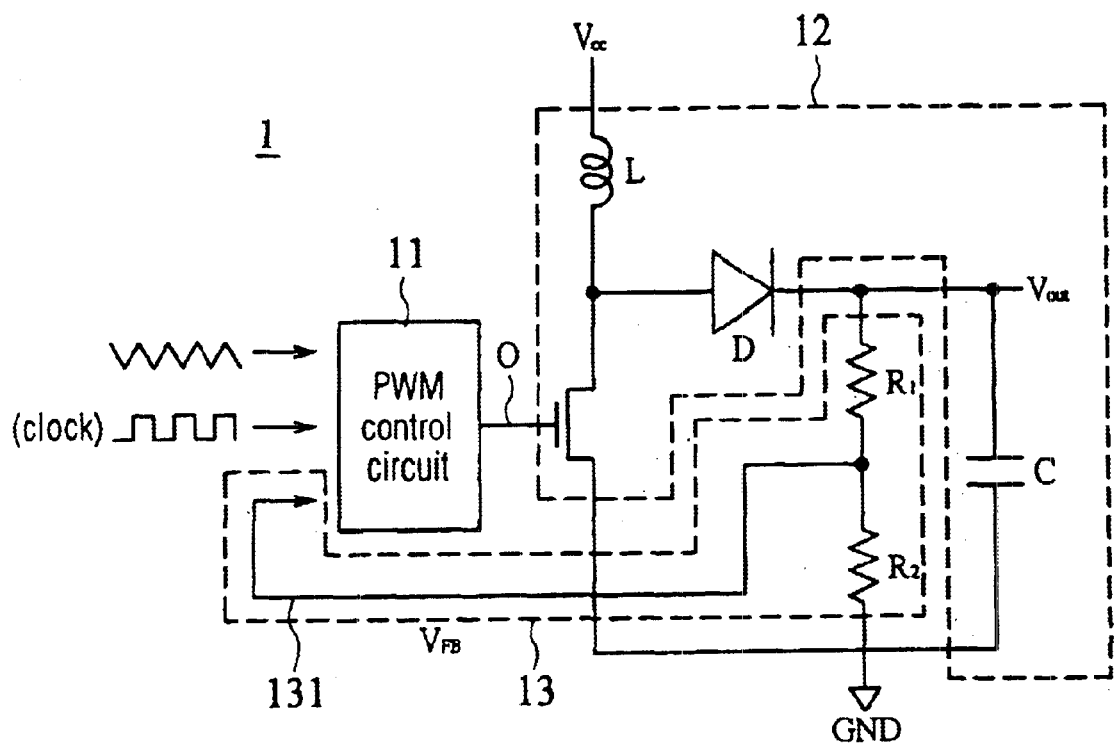
FIG. 1A is a diagram illustrating the circuit configuration of a conventional voltage mode boost converter.
Figure 1B:
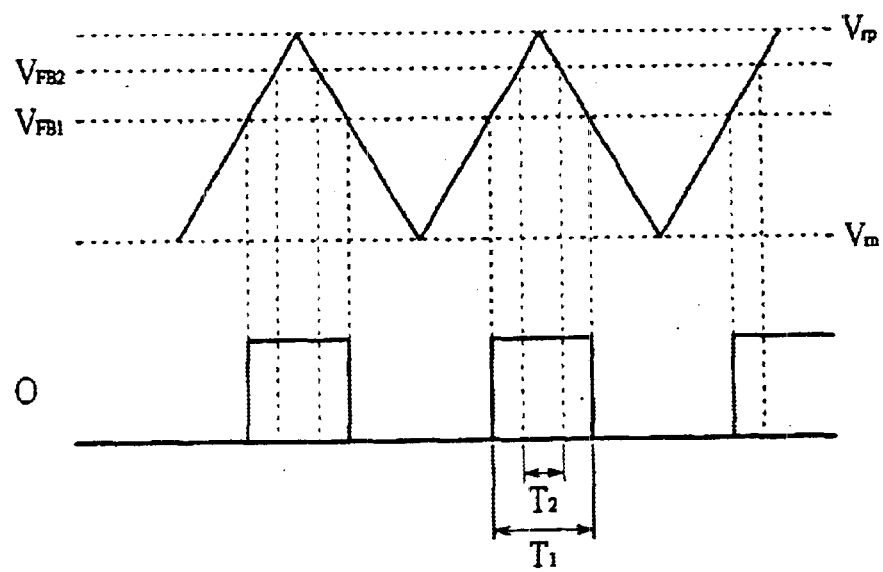
FIG. 1B is a waveform schematic diagram illustrating the relationships among the feedback voltage signal $V_{FB}$, the triangle wave signal, and the signal that appears at the point O, which are all in the circuit of FIG. 1A.
Figure 2A:
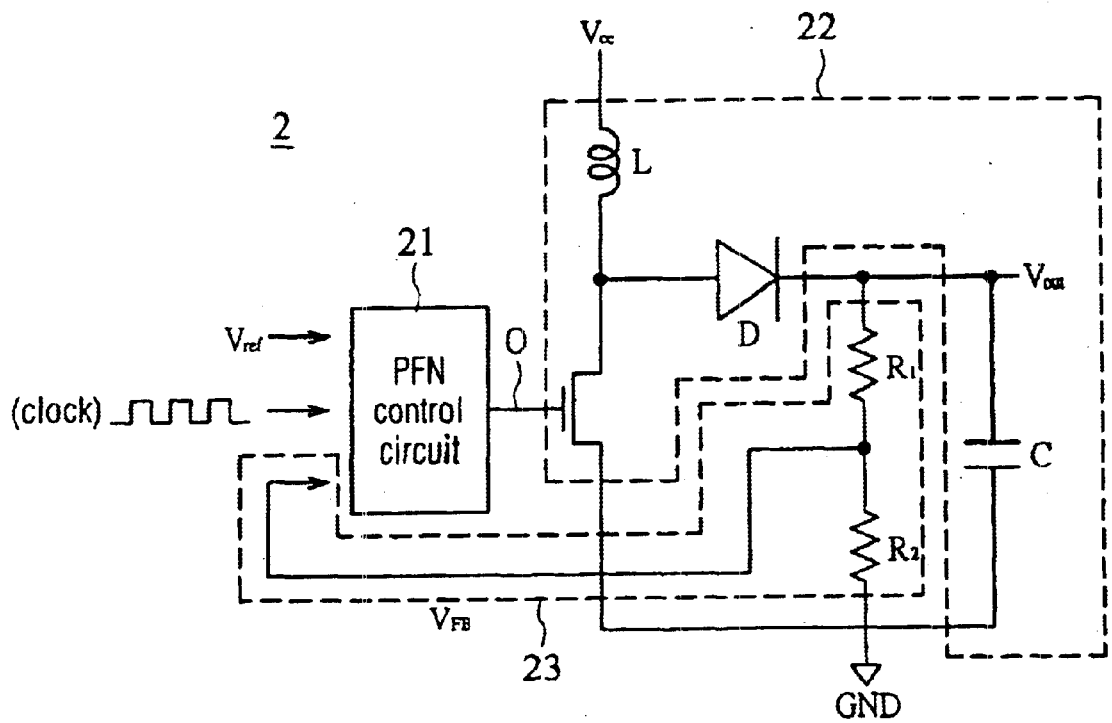
FIG. 2A is a diagram illustrating the circuit configuration of another conventional voltage mode boost converter.
Figure 2B:
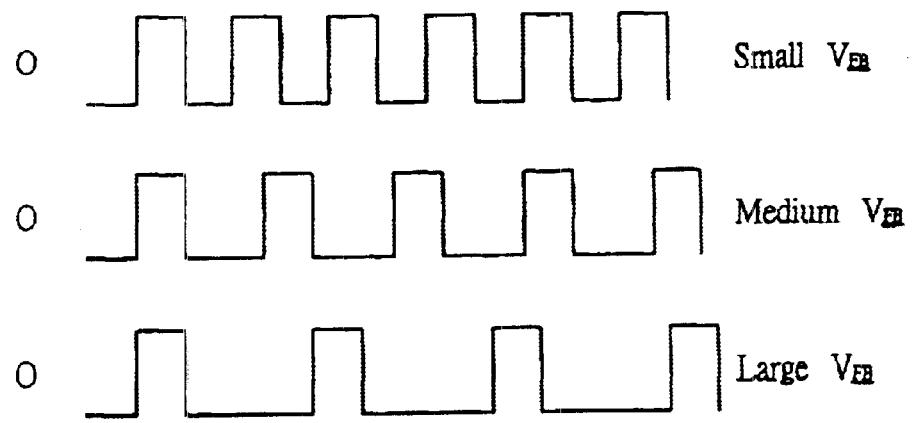
FIG. 2B is a schematic diagram illustrating the signal waveform at the point O shown in FIG. 2A.
Figure 3:
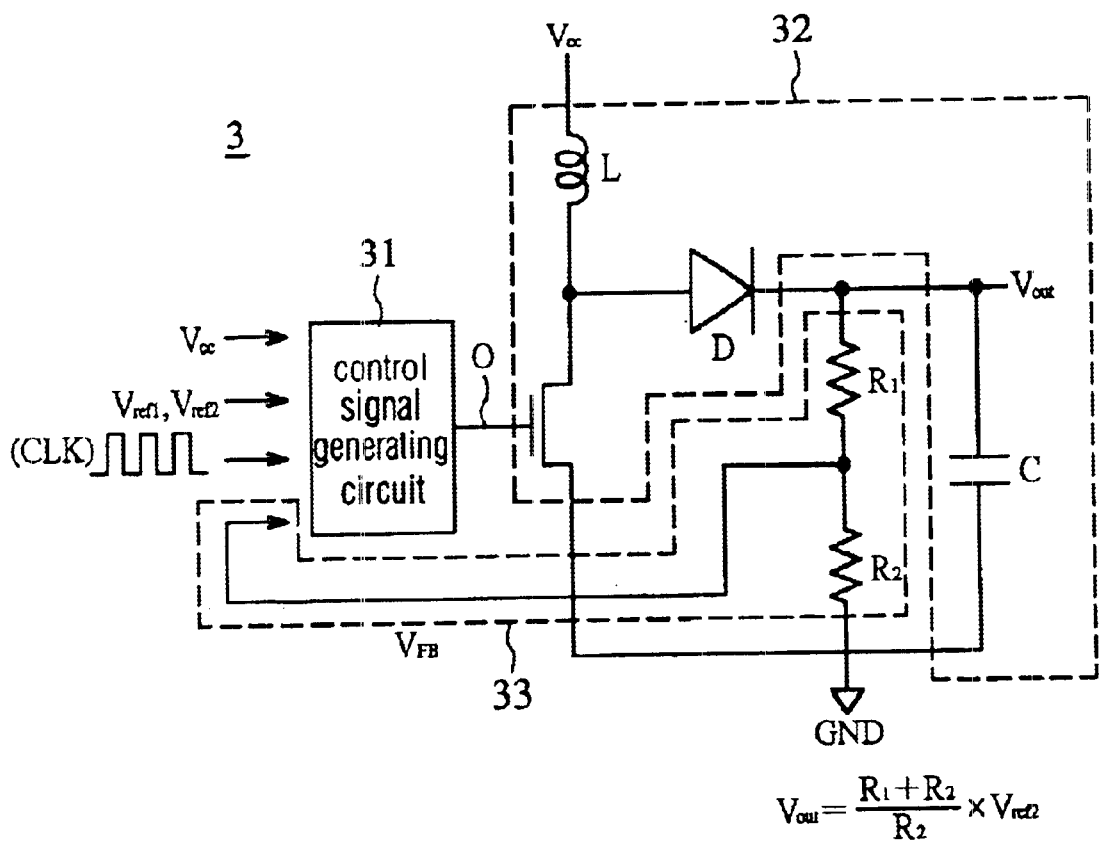
FIG. 3 is a diagram illustrating the circuit configuration of a voltage mode boost converter in accordance with an embodiment of the invention.

With reference to FIG. 3, a voltage mode boost converter in accordance with an embodiment of the invention comprises a control signal generating circuit 31, a step-up circuit 32 and a feedback circuit 33. The circuit configuration and performance of the step-up circuit 32 and the feedback circuit 33 in the embodiment are generally the same as that of the conventional voltage mode boost converter, so the description thereof is omitted here. Additionally, the MOS device used in the embodiment is an NMOS device.

Figure 4:
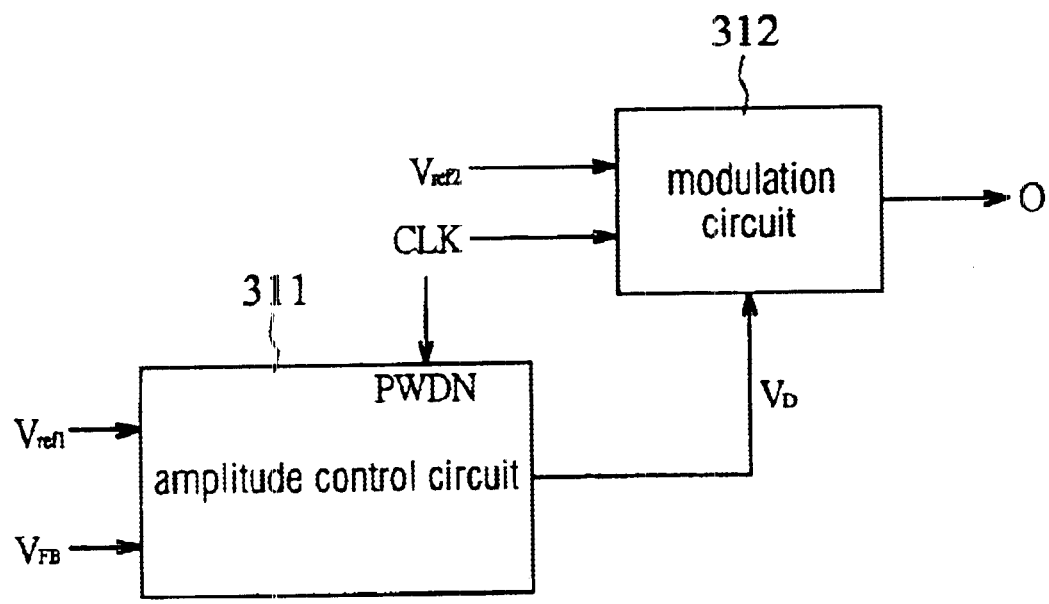
FIG. 4 is a block diagram illustrating the structure of the control signal generating circuit of a voltage mode boost converter according to the invention.
Figure 7:
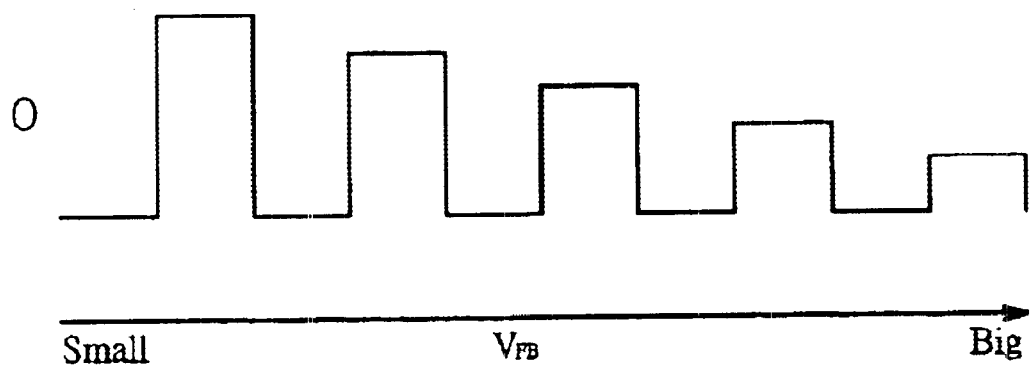
FIG. 7 is a schematic diagram illustrating the signal waveform at the point O shown in FIG. 3.

As shown in FIG. 4, the control signal generating circuit 31 of the voltage mode boost converter 3 in accordance with the invention is an amplitude control circuit 311 and a modulation circuit 312. The amplitude control circuit 311 receives an external voltage signal $V_{CC}$ and a reference voltage signal $V_{ref}$ from outside, and receives a feedback voltage signal $V_{FB}$ generated by the feedback circuit 33; then, in accordance with the external voltage signal $V_{CC}$, the reference voltage signal $V_{ref}$ and the feedback voltage signal $V_{FB}$, the amplitude control circuit 311 generates an amplitude control signal $V_D$. The modulation circuit 312 receives a timing pulse signal CLK from outside, and generates a step-up control pulse signal (i.e., the signal that appears at the point O) according to the timing pulse signal CLK and the amplitude control signal $V_D$. The waveform of the step-up control pulse signal is shown in FIG. 7. It should be noted that as shown in FIG. 4, in addition to being used to generate a step-up control pulse signal, the timing pulse signal CLK is simultaneously input into the amplitude control circuit 311, as a standby signal (hereinafter referred as PWDN) of the amplitude control circuit 311. To go into details, when the CLK is high, the amplitude control circuit 311 is in a standby mode; on the other hand, when the CLK is low, the amplitude control circuit 311 is in an active mode.

Figure 5:
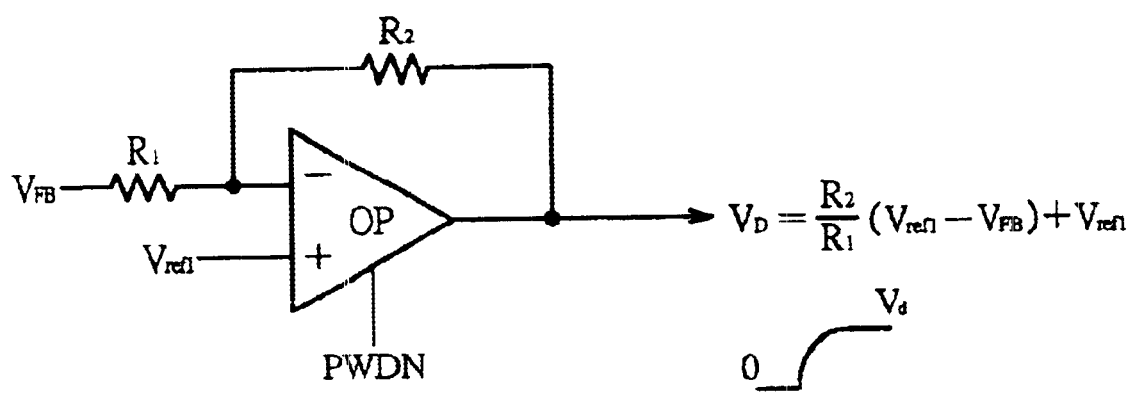
FIG. 5 is a diagram illustrating the circuit configuration of the amplitude control circuit of the control signal generating circuit in accordance with the invention.
Figure 6:
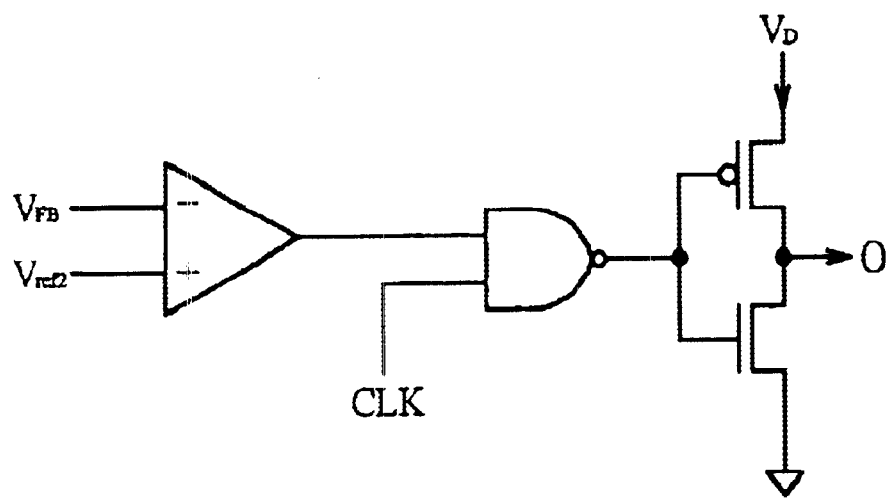
FIG. 6 is a diagram illustrating the circuit configuration of the modulation circuit of the control signal generating circuit in accordance with the invention.

The following further illustrates how the step-up control pulse signal is generated, with reference to FIGS. 5 and 6.

As shown in FIG. 5, the amplitude control circuit 311 of the embodiment of the invention can be configured using two resistors and one comparator. It can be seen from FIG. 5 that $V_D=(R_2/R_1)(V_{ref1}-V_{FB})+V_{ref1}$. When the PWDN is high (i.e., the CLK is high), the amplitude control signal $V_D$ will be low; when the PWDN is turning from high to low, the amplitude of the amplitude control signal $V_D$ will change from O to $V_d$, and at the same time, there will be a rising time for a few microseconds. On the other hand, when the PWDN is turning from low to high, the amplitude of the amplitude control signal $V_D$ will change from $V_d$ to O, and there will also be a falling time for a few microseconds. Since the amplitude control circuit 311 has the above-mentioned features, the amplitude control signal $V_D$ that is output by the amplitude control circuit 311 can then avoid generating a momentarily larger current to the NMOS device; then the feature of high quality voltage is obtained since the larger current can cause a ground-bouncing phenomenon. Furthermore, as the amplitude control circuit 311 changes from O to $V_d$, it enables the voltage mode boost converter 3 of the invention to have the feature of low standby current.

Also, as shown in FIG. 5, since $V_D=(R_2/R_1)(V_{ref1}-V_{FB})+V_{ref1}$, it can be seen that the larger the $V_{FB}$ is, the smaller the $V_D$ will be. Further, when the $V_D$ becomes smaller, the $V_D$ needed to turn on the NMOS gate voltage (shown in FIG. 3) will become smaller, as shown in FIG. 7; consequently, the NMOS Ron resistor will be large. This particular feature makes it possible when the $V_{out}$ approaches the desired high voltage that the output ripple becomes smaller because the increase in the amount of voltage gets smaller each time; therefore, a high voltage of high quality can be obtained.

As shown in FIG. 6, the modulation circuit 312 includes an NMOS device, a PMOS device, a comparator, and a logic device. When the CLK is high, the output of point O is equivalent to the ground, whereas when the CLK is low, the output of point O is equal to $V_D$.

In sum, the voltage mode boost converter 3 of the invention has a feature of standby mode because when it works, it does not have to coordinate with the triangle wave generator. In addition, when the voltage mode boost converter 3 of the invention is turned on, the output of point O of the amplitude control circuit 311 will change from O to $V_d$; therefore, it has the feature of low standby current.

Also, the specific embodiment described in the description of the preferred embodiments is only intended to illustrate the technical contents of the invention; it does not, however, to limit the invention to the specific embodiment described. Accordingly, various modifications and changes can be made without departing from the spirit and scope of the invention as set forth in the appended claims.

What is claimed is:

1. A voltage mode boost converter comprising:
   a control signal generating circuit for generating a step-up control pulse signal with a fixed period and a modulated amplitude in response to a first reference voltage signal, a second reference voltage signal, a timing pulse signal, and a feedback voltage signal, the control signal generating circuit including:
   an amplitude control circuit having:
   a first comparator with a first input terminal, a second input terminal for receiving the first reference voltage signal, and a first output terminal for outputting an amplitude control signal, the first comparator being switched between a standby mode and an active mode in accordance with the timing pulse signal;

a first resistor electrically connected to the first input terminal such that the feedback voltage signal is input into the first terminal through the first resistor; and a second resistor electrically connected between the first input terminal and the first output terminal, and a modulation circuit having:

a second comparator with a third input terminal for receiving the feedback voltage signal, a fourth input terminal for receiving the second reference voltage signal, and a second output terminal;

a logic gate with a fifth input terminal electrically connected to the second output terminal, a sixth input terminal for receiving the timing pulse signal, and a third output terminal;

a PMOS transistor with a gate electrode electrically connected to the third output terminal, a source electrode for receiving the amplitude control signal, and a drain electrode; and an NMOS transistor with a gate electrode electrically connected to the third output terminal, a drain electrode electrically connected to the drain electrode of the PMOS transistor for outputting the step-up control pulse signal with the fixed period and the modulated amplitude, and a source electrode electrically connected to a ground;

a step-up circuit electrically connected to the control signal generating circuit for adjusting an output voltage signal of the step-up circuit in accordance with the step-up control pulse signal with the fixed period and the modulated amplitude; and a feedback circuit electrically connected between the control signal generating circuit and the step-up circuit for generating the feedback voltage signal in accordance with the output voltage signal of the step-up circuit and for inputting the feedback voltage signal to the control signal generating circuit.

2. The voltage mode boost converter according to claim 1, wherein the first input terminal is of an inverting input terminal and the second input terminal is of a non-inverting input terminal.

3. The voltage mode boost converter according to claim 1, wherein the third input terminal is of an inverting input terminal and the fourth input terminal is of a non-inverting input terminal.

4. The voltage mode boost converter according to claim 1, wherein the logic gate is a NAND gate.

5. The voltage mode boost converter according to claim 1, wherein the first comparator is switched to the standby mode when the timing pulse signal is high.

6. The voltage mode boost converter according to claim 1, wherein the first comparator is switched to the active mode when the timing pulse signal is low.

7. The voltage mode boost converter according to claim 1, wherein the step-up circuit further comprises a MOS device, an inductor device, a diode device, and a capacitor device, and among these devices, the MOS device, the diode device, and the capacitor device are connected to one another in series, while the inductor is connected between the MOS device and the diode device in parallel; the gate of the MOS device is electrically connected to the control signal generating circuit for receiving the step-up control pulse signal with the fixed period and the modulated amplitude.

8. The voltage mode boost converter according to claim 1, wherein the feedback circuit further comprises a third resistor, a fourth resistor, and a feedback terminal; the third resistor is connected to the fourth resistor in series, and one end of the feedback terminal is electrically connected between the third resistor and the fourth resistor, while the other end of the feedback terminal is electrically connected to the control signal generating circuit for inputting the feedback voltage signal thereto.

9. The voltage mode boost converter according to claim 7, wherein the MOS device is an NMOS device.

* * * * *